US007025361B1

(12) United States Patent
Erickson

(10) Patent No.: US 7,025,361 B1
(45) Date of Patent: Apr. 11, 2006

(54) ELECTRONIC CONTROLLER FOR A VEHICLE LEVELING SYSTEM AND VEHICLE LEVELING SYSTEM COMPRISING SAME

(75) Inventor: John Scott Erickson, Roscoe, IL (US)

(73) Assignee: Atwood Mobile Products, Inc., Elkhart, IN (US)

( * ) Notice: Subject to any disclaimer, the term of this patent is extended or adjusted under 35 U.S.C. 154(b) by 0 days.

(21) Appl. No.: 10/833,403

(22) Filed: Apr. 28, 2004

Related U.S. Application Data

(60) Provisional application No. 60/474,909, filed on Jun. 2, 2003, provisional application No. 60/477,466, filed on Jun. 10, 2003.

(51) Int. Cl.
B60S 9/00 (2006.01)

(52) U.S. Cl. .............................. 280/6.153; 280/6.154; 280/6.155

(58) Field of Classification Search ............... 280/6.15, 280/6.153, 6.1, 6.12, 6.151, 6.154, 6.155, 280/6.157; 701/36
See application file for complete search history.

(56) References Cited

U.S. PATENT DOCUMENTS

| 5,176,391 A * | 1/1993 | Schneider et al. ....... 280/6.153 |
| 5,890,721 A * | 4/1999 | Schneider et al. ....... 280/6.153 |
| 5,915,700 A * | 6/1999 | Schneider et al. ....... 280/6.153 |
| 6,176,495 B1 * | 1/2001 | Decker .................... 280/6.153 |
| 6,351,696 B1 * | 2/2002 | Krasny et al. ................ 701/50 |
| 6,584,385 B1 * | 6/2003 | Ford et al. ..................... 701/36 |

* cited by examiner

Primary Examiner—Paul N. Dickson
Assistant Examiner—Toan C. To
(74) Attorney, Agent, or Firm—Banner & Witcoff, Ltd.; Peter D. McDermott; Dean B. Watson

(57) ABSTRACT

An electronic controller for a vehicle leveling system comprises an extend-enable switch, a retract-enable switch, an all-activate switch, and at least one group-activate switch. It is configured to generate an all-extend electronic signal upon coordinated actuation of the extend-enable switch and the all-activate switch, an all-retract electronic signal upon coordinated actuation of the retract-enable switch and the all-activate switch, a group-extend electronic signal upon coordinated actuation of the extend-enable switch and the group-activate switch, and a group-retract electronic signal upon coordinated actuation of the retract-enable switch and the group-activate switch. Vehicle leveling systems having the electronic controller further include a plurality of jacks operably controlled by the electronic controller and a power system.

25 Claims, 2 Drawing Sheets

ELECTRONIC CONTROLLER FOR A VEHICLE LEVELING SYSTEM AND VEHICLE LEVELING SYSTEM COMPRISING SAME

This utility patent application claims the benefit of both U.S. Provisional Application No. 60/474,909 filed Jun. 2, 2003 and U.S. Provisional Application No. 60/477,466 filed Jun. 10, 2003.

FIELD OF THE INVENTION

The inventive concepts disclosed here relate to vehicle leveling systems and to electronic controllers for such systems and to vehicles equipped with such systems.

BACKGROUND OF THE INVENTION

Vehicle leveling systems, for example, leveling systems used to level or stabilize a motor home when it is parked, are known to employ mechanical, electromechanical or hydraulic jacks for leveling. Mechanical jacks typically require individual manual deployment by the operator and are, therefore, time and labor intensive. Hydraulic jacks can be automated for remote operation, but typically only operate automatically in one direction in a controlled fashion. That is, they can be configured to extend automatically, but subsequent retraction is done by vehicle weight applied to the jack and/or by a coil spring. Therefore, making fine adjustments to level a vehicle equipped with hydraulic jacks can be time consuming and difficult, and fine adjustments typically can be done in extension but not retraction.

Electromechanical jacks can be electronically actuated in either direction, i.e., extended or retracted, but have not been fully adopted for vehicle leveling systems in view of the electrical power required to operate them. The amount of required power increases as the weight of the load supported by the electromechanical jack increases. In many applications, only one electromechanical jack has been operable at a time, making the process of extending or retracting all the jacks, in order to level the vehicle, a time consuming operation.

It is an object of one aspect of the present invention to provide electronic controllers for vehicle leveling systems that reduce or overcome some or all of the shortcomings of prior known devices and systems. It is a particular object of certain preferred embodiments to provide an electronic controller for a vehicle leveling system employing electromechanical jacks. It is a further object of certain preferred embodiments to provide an electronic controller for a vehicle leveling system configured for automated or remote control extension and retraction of multiple leveling jacks simultaneously. It is an object of another aspect of the present invention to provide vehicle leveling systems incorporating such electronic controllers. Additional objects and advantages will be apparent to those skilled in the art, that is, those who are knowledgeable or experienced in this field of technology, in view of the following disclosure of the various aspects of the invention and detailed description of certain preferred embodiments.

SUMMARY

In accordance with a first aspect, an electronic controller, suitable for controlling extension and retraction of the leveling jacks of a vehicle leveling system, has an extend-enable switch, a retract-enable switch, an all-activate switch, and at least one group-activate switch. In preferred embodiments, an electronic controller as disclosed here is configured for use in a vehicle leveling system comprising electromechanical jacks. In certain such preferred embodiments, the electromechanical jacks are ball-screw jacks. Exemplary suitable electromechanical jacks are taught in U.S. patent application Ser. No. 10/022,604 entitled "Multiple Screw Jack" the disclosure of which is incorporated herein by reference in its entirety for all purposes. Preferably, the controller has multiple group-activate switches, each corresponding to (i.e., configured to control) a different sub-set of the vehicle leveling system's leveling jacks. The electronic controller may also be referred to as a control module and is configured to generate:

an all-extend electronic signal upon coordinated actuation of the extend-enable switch and the all-activate switch, an all-retract electronic signal upon coordinated actuation of the retract-enable switch and the all-activate switch, a group-extend electronic signal upon coordinated actuation of the extend-enable switch and a group-activate switch (or the group-activate switch if the electronic controller has only one group-activate switch), and a group-retract electronic signal upon coordinated actuation of the retract-enable switch and a group-activate switch (or the group-activate switch if the electronic controller has only one group-activate switch).

In certain preferred embodiments, coordinated actuation of two switches (e.g., the extend-enable switch and the all-activate switch) is performed by (i.e., requires) simultaneous actuation of the switches. Switch actuation in various embodiments of the electronic controllers disclosed here may be performed, depending on the particular type of switch employed, by pressing the switch, throwing the switch, touching the switch, etc. In certain preferred embodiments, coordinated actuation of switches is performed by actuation of a first one of the switches (optionally in any order or in a particular required order) followed by subsequent actuation of the second switch, for example, actuation of the second switch within a certain pre-determined period of time after actuation of the first switch, e.g., within a time limit of 0–10 seconds, preferably within a time limit of 0–5 seconds, more preferably within about 2 or 3 seconds of actuating the first switch. In other preferred embodiments, coordinated actuation of switches of the controller requires only that the second switch be actuated without intervening actuation of any other switch of the electronic controller, etc. In other preferred embodiments, coordinated actuation of the extend-enable switch (or retract-enable switch) with any group-activation switch of the controller requires only that a desired group-activation switch be actuated after actuation of the extend-enable switch, even with intervening actuation of any other group-activation switch of the electronic controller, but without actuation of any other switch. Other suitable coordinated actuation schemes will be apparent to those skilled in the art given the benefit of this disclosure.

In accordance with a second aspect, a vehicle leveling system comprises multiple or a plurality of leveling jacks, for example, two to four leveling jacks, and an electronic controller operably connected to the leveling jacks to control extension and retraction of the jacks. In some examples, the leveling jacks typically are positioned proximate the four corners of the vehicle, such as a motor home, a camper or the like. As the term is used here, a leveling jack is "proximate" a vehicle corner if it is positioned to raise and lower the vehicle primarily or in largest degree at that corner. In certain examples, the electronic controller comprises an extend-enable switch configured to enable extension of selected ones or all of the jacks of the system when activated in coordination with an appropriate other switch of the electronic controller, a retract-enable switch configured to enable retraction of selected ones or all of the jacks of the system when activated in coordination with an appropriate other switch of the electronic controller, an all-activate switch and at least one group-activate switch. In some examples, the all-activate switch is configured to extend or retract all of the jacks upon coordinated actuation with the extend-enable switch or the retract-enable switch, respectively. In certain examples, the group-activate switch is configured to extend or retract a selected sub-set of the jacks upon coordinated actuation with the extend-enable switch or the retract-enable switch, respectively. A typical vehicle leveling system in accordance with the present disclosure has, for example, four leveling jacks positioned one-each at the four corners of the vehicle and an electronic switch having the aforesaid extend-enable, retract-enable and all-activate switches with four group-activate switches. A first group-activate switch is configured to control the front two jacks. Directional references may be taken, for convenience, to refer to the traditional vehicle orientation directions, such that, for example, "front" refers to front of the vehicle. A second group-activate switch is configured to control the rear two jacks. A third group-activate switch is configured to control the right side (e.g., passenger-side) two jacks. Finally, the fourth group-activate switch is configured to control the left-side two jacks. In this example, each group-activate switch controls a sub-set of jacks, and each jack in the exemplary system just described is included in more than one such sub-set. More generally, it should be understood that any one leveling jack may be included in more than one sub-sets of jacks, where each sub-set corresponds to a different group-activate switch. Alternative suitable allocation of the leveling jacks of a system into sub-sets, each controlled by a different group-activation switch, will be readily apparent to those skilled in the art given the benefit of this disclosure.

In certain preferred embodiments, the vehicle leveling systems disclosed here comprise electromechanical jacks. In certain such preferred embodiments, the electromechanical jacks are ball-screw jacks, e.g., the electromechanical jacks taught in above-mentioned U.S. patent application Ser. No. 10/022,604 entitled "Multiple Screw Jack." A typical such embodiment comprises four electromechanical jacks, with one jack proximate each corner of the vehicle to be leveled (i.e., the front-right, front-left, rear-right and rear-left corners). Other suitable arrangements will be apparent to one skilled in the art given the benefit of this disclosure.

In accordance with another aspect, a method is provided for leveling a vehicle when the vehicle is parked by remotely controlling the extension and retraction of leveling system jacks, preferably by controlling the jacks from the passenger compartment of the vehicle or from a control panel easily accessible to an operator. Such method comprises coordinated actuation of switches of the electronic controller to extend or retract the system's jacks to level the vehicle. Such coordinated actuation of the switches of the electronic controller comprises any or all of:

coordinated actuation of the all-activate switch and the extend-enable switch to generate an all-extend electronic signal to simultaneously extend all the jacks of the leveling system, coordinated actuation of the all-activate switch and the retract-enable switch to an all-retract electronic signal to simultaneously retract all the jacks of the leveling system, coordinated actuation of the extend-enable switch and the appropriate group-activate switch (or the extend-enable switch and the only group-activate switch if the electronic controller has only one group-activate switch) to generate a group-extend electronic signal to simultaneously extend the sub-set of jacks controlled by that group-activate switch, and/or coordinated actuation of the retract-enable switch and the appropriate group-activate switch (or the retract-enable switch and the only group-activate switch if the electronic controller has only one group-activate switch) to generate a group-retract electronic signal to simultaneously retract the sub-set of jacks controlled by that group-activate switch.

These and additional features and advantages of the invention disclosed here will be further understood from the following detailed disclosure of certain preferred embodiments.

Figure 1:
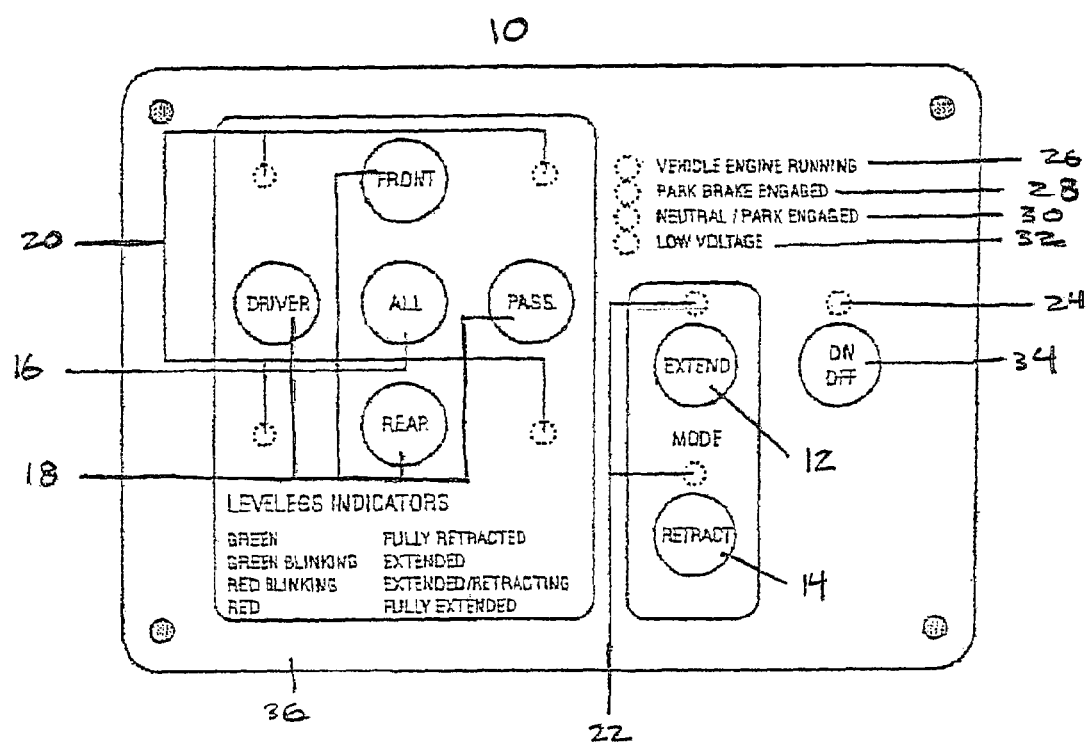
FIG. 1 is a schematic view of a preferred embodiment of the electronic controllers disclosed here.

The figures referred to above are not necessarily to scale and should be understood to present exemplary representations of the inventive concepts, illustrative of the principles involved. Some features of the electronic controllers and leveling systems depicted in the drawings may have been enlarged or distorted relative to others to facilitate explanation and understanding of the novel subject matter disclosed here.

DETAILED DESCRIPTION OF CERTAIN PREFERRED EMBODIMENTS

Figure 2:
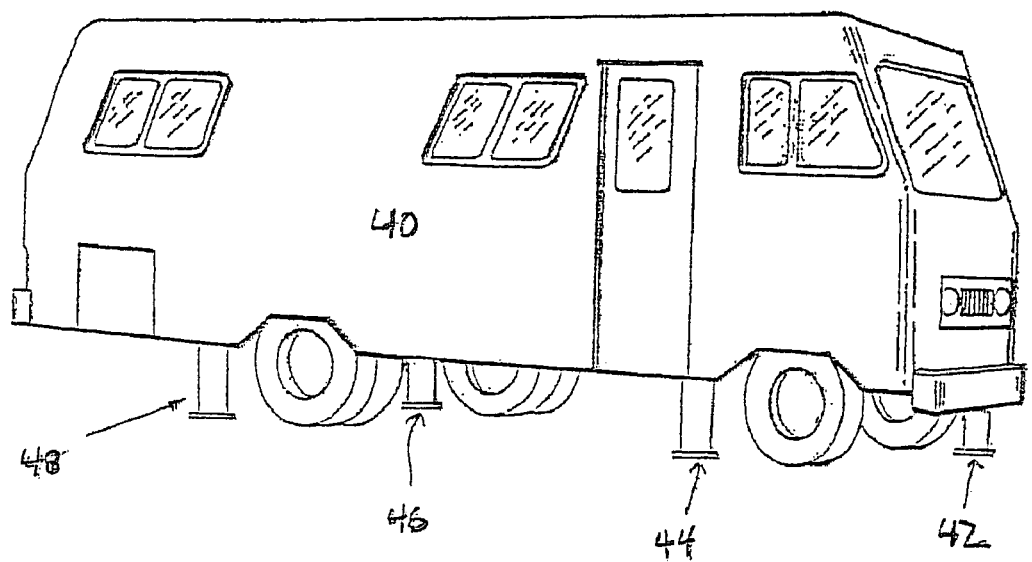
FIG. 2 is a schematic perspective view of a vehicle equipped with the electronic controller of FIG. 1, having four jacks positioned at corresponding ones of the four corners of the vehicle.

It will be understood by the person of ordinary skill in the art, that any particular embodiment of the electronic controllers and leveling systems disclosed here will have configurations and components determined, in part, by the intended application and environment in which it is used. That is, the design details of any particular embodiment of the electronic controllers disclosed here, or of the leveling systems disclosed here, will depend, in part, on the requirements of its particular use, e.g., the configuration and size of the vehicle, assembly requirements, cost considerations, expected environmental conditions, etc. It will be within the ability of those skilled in the art to design and develop particular embodiments suitable to an intended use, given the disclosure here of the principles of the invention and certain exemplary and preferred embodiments. In a first embodiment, as seen in FIGS. 1 and 2, an electronic controller 10 for a vehicle leveling system comprises an extend-enable switch 12, a retract-enable switch 14, an all-activate switch 16, and four group-activate switch 18. Each of the four group-activate switches is individually marked differently from the others. Specifically, FIG. 1 shows a "front" group-activate switch, a "pass" group-activate switch, a "rear" group-activate switch, and a "driver" group-activate switch. The front group-activate switch controls the front two jacks of the system, i.e., jacks 42 and 44. The pass group-activate switch controls the two passenger side jacks of the system, i.e., jacks 48 and 44. The rear group-activate switch controls the rear two jacks of the system, i.e., jacks 46 and 48. The driver group-activate switch controls the two driver side jacks of the system, i.e., jacks 42 and 46.

In certain examples, the electronic controller 10 is configured to generate an all-extend electronic signal upon coordinated actuation, e.g., simultaneous coordinated actuation, of the extend-enable switch 12 and the all-activate switch 16. The all-extend electronic signal actuates extension of all four jacks simultaneously. The electronic controller 10 is configured also to generate an all-retract electronic signal upon coordinated actuation of the retract-enable switch 14 and the all-activate switch 16. The all-retract electronic signal actuates retraction of all four jacks simultaneously. The electronic controller 10 is configured also to generate a group-extend electronic signal upon coordinated actuation the extend-enable switch 12 and any one of the four group-activate switches 18. For example, upon coordinated actuation of the extend-enable switch and the driver group-activate switch, the two driver-side jacks 42, 46 are actuated to extend. Upon coordinated actuation of the extend-enable switch and the rear group-activate switch, the two rear jacks 46 and 48 are actuated to extend, and so on. The electronic controller 10 is configured also to generate a group-retract electronic signal upon coordinated actuation of the retract-enable switch 14 and any one of the four group-activate switches 18. For example, upon coordinated actuation of the retract-enable switch and the driver group-activate switch, the two driver-side jacks 42, 46 are actuated to retract, and so on.

In an embodiment shown in FIGS. 1 and 2, the electronic controller further comprises a front panel 36 to which the switches are mounted. The front panel 36 facilitates mounting the electronic controller, e.g., to vehicle 40's dashboard or other suitable location. Typically, the electronic controller 10 is configured to be dash mounted in the vehicle, for example. Examples of vehicles in which the electronic controllers and leveling systems disclosed here can be used include, but are not limited to, truck trailers, campers, fifth wheels, and motor homes. The electronic controller 10 typically is used in conjunction with a bubble level to level the vehicle. In other embodiments, the electronic controller 10 is used in conjunction with an electronic level sensor. Other embodiments will be apparent to those skilled in the art given the benefit of this disclosure. Preferably, such electronic level sensor generates a signal that drives a display visible to the operator during operation of the leveling system. As used here, a signal drives or actuates (or activates) the display—and, more generally, any signal generated by the electronic controller or other component of the system may be said to drive or actuate (or activate) a leveling jack or other component of the system—if display, jack or other component, as the case may be, receives the signal directly and acts in response thereto or if the signal is first processed by a suitable signal processor or the like to generate a derivative signal that is received by the device, or if the signal is received by another device, such as an intermediate device, e.g., a power source, that then powers or otherwise interacts with the device. Other suitable embodiments will be apparent to those skilled in the art given the benefit of this disclosure.

In certain examples, the electronic signals generated by the electronic controller to actuate jacks of the leveling system may be transmitted individually or as part of a combination control signal to other components of the leveling system. The signals may be transmitted over a single wire, multiple wires or wirelessly. In some embodiments, the electronic controller may be configured to operate remotely from the vehicle. In such embodiments, the electronic controller 10 may be wirelessly in communication with the leveling system using infrared, microwave, radio wave or other suitable wireless communication link. Such wireless communication can use any suitable communication protocol, for example, wi-fi, bluetooth, or other standard protocol or a proprietary protocol, with or without encryption. Other suitable embodiments will be apparent to those skilled in the art given the benefit of this disclosure.

In some examples, the extend-all electronic signal directs the system to simultaneously extend all of the jacks of the leveling system. The retract-all electronic signal directs the system to simultaneously retract all of the jacks of the leveling system. Each group-extend electronic signal directs the system to extend a different corresponding sub-set of the jacks of the leveling system. Similarly, the group-retract electronic signal generated by coordinated actuation of the retract-enable switch and one of the group-activate switches directs the vehicle leveling system to retract the corresponding sub-set of the jacks of the leveling system. As disclosed above, in preferred embodiments there are multiple group-activate switches, each being configured to control a different sub-set of the jacks. For example, the electronic controller may comprise a second group-activate switch configured (i) to generate a second group-extend electronic signal to extend a second sub-set of the jacks (different from the first sub-set) upon coordinated actuation with the extend-enable switch, and (ii) to generate a second group-retract electronic signal to retract such second sub-set of jacks upon coordinated actuation with the retract-enable switch. The third, fourth and other group-activation switches each is similarly configured to control third, fourth and other sub-sets of the jacks by generating third group-extend (or group-retract) electronic signals upon coordinated actuation of the third group-activation switch with the extend-enable switch (or the retract-enable switch), and so on. In certain embodiments, a sub-set of jacks being activated may comprise more than two jacks of the leveling system, but a group-activation switch does not activate all of the jacks. That is, a "sub-set" of the jacks, as that term is used here, is less than all of the jacks of the leveling system in the sense that a group-activation switch is not configured to cause simultaneous extension of all of the jacks of the system, or to cause simultaneous retraction of all of the jacks. However, in certain embodiments having at least two group-activate switches, each being configured to simultaneously control the members of a different subset of the jacks, actuation of a group-activation switch may cause movement of all of the jacks, at least in certain situations. Specifically, upon coordinated actuation of a group-activation switch in such embodiments together with the extend-enable switch generates a group-extend electronic signal to the corresponding sub-set of jacks, and also simultaneously activates retraction of a second sub-set of jacks, e.g., by generating a group-retract signal to the members of the second sub-set of jacks. Such simultaneous extraction of a group of jacks and simultaneous retraction of another group of jacks can provide for rapid leveling and maximum utilization of stroke. Similarly, retracting the first sub-set may be done with simultaneous extension of the second sub-set. Typically, the switches of the electronic controller of such embodiments are configured to simultaneously extend a sub-set that is opposite to a subset being retracted, and vise-versa. Thus, for example, two front jacks may be extended simultaneously with retraction of the two rear jacks. And the right-side jacks may be extended simultaneously with retraction of the left-side jacks.

As shown in FIG. 1, electronic controller 10 comprises an extend-enable switch 12 configured to enable extension of jacks of the leveling system, a retract-enable 14 switch configured to enable retraction of jacks of the leveling system, and an all-activate switch 16. Upon coordinated actuation of all-activate switch 16 with extend-enable-switch 12, all jacks of the leveling system are extended. Upon coordinated actuation of all-activate switch 16 with retract-enable switch 14, all jacks of the leveling system are retracted.

In some embodiments, the electronic controller 10 further comprises one or a plurality of selectively illuminable visual indicators for indicating the status the leveling system. The embodiment illustrated in FIG. 1 is seen to have illuminable visual indicators 20 indicating the status of the jacks of the leveling system. Examples of jack conditions that may be indicated by such visual indicators include, but are not limited to, fully retracted, extended, and fully extended. There may also be illuminable visual indicators 22 indicating the operational mode of the electronic controller 10, such as extend mode and retract mode as well as a power on/off indicator 24. Thus, for example, the extend mode indicator may be illuminated during jack extension and the retract mode indicator may be illuminated during jack retraction. In embodiments having additional features, there may be illuminable visual indicators indicating the operational or other status of those features. Examples include, but are not limited to, an indicator 26 to indicate whether the vehicle engine is running, an indicator 28 to indicate whether the parking brake is engaged 28, an indicator 30 to indicate whether the vehicle is in Park or Neutral transmission setting, and an indicator 32 to indicate whether the voltage of the system is within operational limits. Examples of suitable illuminable visual indicators include, but are not limited to, incandescent bulbs, LEDs, multi-color LEDs, liquid crystal displays and the like. Other devices suitable to serve as indicators, including other light emitting devices, sound emitting devices, etc. will be apparent to those skilled in the art given the benefit of this disclosure.

The various switches of the electronic controller may be provided in any suitable form of type, including, for example, toggle switches, push button switches, touch switches, etc. Numerous suitable switch types will be apparent to those skilled in the art given the benefit of this disclosure. In this regard, for example, extend-enable switch 12 may comprise a push button or touch panel switch. Actuation of this switch places the leveling system in extend mode wherein jacks of the leveling system can be extended by coordinated actuation of either the all-activate switch 16 or a group-activate switch 18. In embodiments where there are illuminable visual indicators, the activation of extend mode may be indicated by illumination of a corresponding indicator 22. Similarly, the retract-enable switch 14 may comprise a push button or touch panel switch. Actuation of this switch places the leveling system in retract mode wherein jacks can be retracted by coordinated actuation of either the all-activate switch 16 or a group-activate switch 18. In embodiments where there are illuminable visual indicators, the activation of retract mode may be indicated by illumination of a corresponding indicator 22. Similarly, operation of other switches with corresponding status indicators will be understood by those skilled in the art given the benefit of this disclosure.

Any embodiment of the electronic controllers disclosed here may have a power switch configured to control power to the controller. In the embodiment illustrated in FIG. 1, for example, electronic controller 10 is seen to further comprise power switch 34 for selectively actuating the controller 10. The power switch 34 may be a push-button or touch panel switch or other suitable switch, including, generally, any of those disclosed above. In embodiments having status indicators, the status of the electronic controller ("on" or "off") may be indicated by an indicator, such as illuminable visual indicator 24 or any of the other indicator types disclosed above. In certain embodiments, the electronic controller 10 automatically turns off after a predetermined period of inactivity, e.g., from the last activation. Other power control and status indicator embodiments will be apparent to one skilled in the art given the benefit of this disclosure.

Embodiments of the electronic controllers disclosed here optionally further comprise a processor for controlling some or all of the operations of the electronic controller. Preferably, the electronic controller comprises a processor operative to monitor at least the status of the leveling system and to automate some or all of the processes performed by the electronic controller. Suitable processors include, for example, microprocessors. Examples of suitable processors will be readily apparent to those skilled in the art given the benefit of this disclosure. Embodiments of the electronic controllers disclosed here optionally further comprise electronic memory for storing information, e.g., information about the status of the leveling system overall, status of each individual jack (e.g., whether it is extended, fully extended or fully retracted, etc.), usage history and the like. For example, in some embodiments the extension time for each jack is stored and compared to the retraction time for that jack. If a discrepancy is determined, or a discrepancy greater than an allowable amount is determined, a corresponding signal or display is generated to alert the operator, e.g., a visual or audible indicator to inform the operator of the status of the jack. The memory may, for example, be RAM, SDRAM or any other suitable memory type or format, either permanent or removable. Other suitable memory and other suitable electronic components and features for inclusion in the controller will be apparent to one skilled in the art given the benefit of this disclosure.

Any embodiment of the electronic controllers disclosed here may have a sensor or other device for detecting the transmission setting of the vehicle, e.g., for determining whether the transmission of the vehicle being leveled is in park or neutral or for receiving and responding to a signal from a suitable remote sensor, linkage or the like, corresponding to transmission status. In embodiments having status indicators, the electronic controller optionally has a visual or audible indicator of whether the vehicle is in or out of park or neutral. In the embodiment illustrated in FIG. 1, for example, the electronic controller comprises indicator 30. In some embodiments, the electronic controller 10 may be configured to prevent operation of the leveling system if the vehicle is not in park or neutral. For example, the electronic controller may comprise a lock-out device corresponding to those used to prevent shifting a vehicle transmission out of park unless the brake pedal is being depressed by the operator. The electronic controllers disclosed here optionally may be configured to automatically retract some or all of the leveling jacks if the vehicle is taken out of park or neutral while the jacks are extended. Such automatic retraction can reduce damage to the leveling system. Optionally a visual, audible or other indicator may be actuated in event of such automatic retraction to alert the operator. Other such embodiments will be apparent to one skilled in the art given the benefit of this disclosure.

Any embodiment of the electronic controllers disclosed here may have a sensor or other device for detecting whether the vehicle's parking brake is engaged, or for receiving and responding to a signal from a suitable remote sensor, linkage or the like, corresponding to parking brake status. In embodiments having status indicators, the electronic controller optionally has a visual, audible or other indicator of parking brake status. In the embodiment illustrated in FIG. 1, for example, the electronic controller comprises indicator 28. In some embodiments, the electronic controller 10 may be configured to prevent operation of the leveling system if the vehicle's parking brake is not engaged. For example, the electronic controller may comprise a lock-out device corresponding to those used to prevent shifting a vehicle transmission out of park unless the brake pedal is being depressed by the operator. In some examples, the electronic controllers disclosed here optionally may be configured to automatically retract some or all of the leveling jacks if the vehicle's parking brake is disengaged while the jacks are extended. Such automatic retraction can reduce damage to the leveling system. Optionally a visual, audible or other indicator may be actuated in event of such automatic retraction to alert the operator. Other such embodiments will be apparent to one skilled in the art given the benefit of this disclosure.

Any embodiment of the electronic controllers disclosed here may have a sensor or other device for monitoring the voltage level being provided to the leveling system, or for receiving and responding to a signal from a suitable remote voltage level sensor. In embodiments having status indicators, the electronic controller optionally has a visual, audible or other indicator of voltage level status. In the embodiment illustrated in FIG. 1, for example, the electronic controller comprises indicator 32. Optionally, the electronic controller 10 may be configured to prevent operation of the leveling system if the voltage level is unacceptable for proper operation of the leveling system. Other such embodiments will be apparent to one skilled in the art given the benefit of this disclosure.

Any embodiment or example of the electronic controllers disclosed here may have a sensor or other device for monitoring the current level being provided to the leveling system, or for receiving and responding to a signal from a suitable remote voltage level sensor. In embodiments having status indicators, the electronic controller optionally has a visual, audible or other indicator of current level status. It will be within the ability of the person of ordinary skill, given the benefit of this disclosure, in the art to select suitable indicators.

Optionally, the electronic controller 10 may be configured to prevent operation of the leveling system if the voltage level is unacceptable for proper operation of the leveling system. Other such embodiments will be apparent to one skilled in the art given the benefit of this disclosure.

Any embodiment of the vehicle leveling systems disclosed here may comprise: a plurality of electromechanical leveling jacks; an electronic controller having an extend-enable switch configured to enable extension of jacks of the leveling system, a retract-enable switch configured to enable retraction of jacks of the leveling system, an all-activate switch configured to control simultaneous actuation of all of the jacks when activated in coordination with the extend-enable switch or the retract-enable switch, and at least one group-activate switch configured to control simultaneous actuation of a sub-set of the jacks when activated in coordination with the extend-enable switch or the retract-enable switch; and a power system operable to provide operating power to the jacks (i.e., power to retract and extend the jacks, as needed, to level the vehicle) controlled at least in part by the electronic controller. In a vehicle driven by an internal combustion engine, the power system optionally comprises an alternator or generator driven by the internal combustion engine, one or more storage batteries and electrical leads and other suitable power delivery and control circuitry. Optionally, the electronic controller comprises a processor, as disclosed above, and power delivery to the jacks is controlled at least in part by control signals generated by such processor in response to operator actuation of the various leveling switches of the electronic controller. Preferably, as disclosed above, the electromechanical leveling jacks are ball screw jacks as disclosed in U.S. application Ser. No. 10/022,604 entitled "Multiple Screw Jack" which is hereby incorporated by reference in its entirety for all purposes. In certain such preferred embodiments, one jack is located at or near each corner of the vehicle. A clutch is fitted to each jack. At a maximum design torque, the clutch will operate to protect the jack's motor from drawing excessive current. In any of the embodiments disclosed here, current, e.g., one or more Amp readings or Amp draws, can be monitored and compared periodically, continuously, semi-continuously, etc., e.g., by a processor of the electronic controller. For example, current can be compared to a value or pattern indicative of impending clutch actuation. Such comparison can be used, for example, to determine when the jack is fully extended or fully retracted. Other suitable jacks and power generation and delivery configurations will be apparent to one skilled in the art given the benefit of this disclosure.

The power system optionally is in communication with the electromechanical jacks and the electronic controller via a relay pack having power relays to close the circuit to each jack in either polarity as well as apply power for dynamic breaking. Exemplary suitable relays will be apparent to those skilled in the art given the benefit of this disclosure. The switching power for the relays preferably is provided by the electronic controller or from a power source operative in response to a control signal generated by the electronic control module. The power system optionally is protected by an over-current protective device. Exemplary suitable will be apparent to those skilled in the art given the benefit of this disclosure. Optionally, each jack is protected by a replaceable fuse or other sacrificial link. Exemplary suitable fuses and links will be apparent to those skilled in the art given the benefit of this disclosure.

As discussed above, embodiments of the vehicle leveling systems disclosed here may be configured to simultaneously operate opposite pairs (or other substantially opposite subsets) of jacks upon coordinated actuation of a group-activation switch and either the extend-enable switch or the retract-enable switch. That is, in such embodiments actuating one of the group-activate switches to extend a fist sub-set of the system's leveling jacks not only activates the jacks of that sub-set, but also oppositely activates the jacks of an opposite (e.g., generally opposed) sub-set of the jacks. Thus, the electronic controller can be configured to retract the jacks of a second sub-set of leveling jacks when the operator calls for extension of an opposite sub-set, or vise-versa. For example, coordinated actuation of a first group-activation switch and the extend-enable switch can in such embodiments cause the first sub-set of jacks to extend and, at least under certain circumstances, at that time also cause different jacks, i.e., the leveling jacks of a different sub-set, to retract. For example, such circumstances may be predetermined to include one or more of the jacks of the first sub-set reaching full-extension. Other conditions warranting reverse activation of an opposite sub-set of jacks will be readily apparent to those skilled in the art given the benefit of this disclosure.

Examples of the electronic controller disclosed here may be used or included with a keypad, buttons, systems and the like. That is, a device may include the electronic controller disclosed here optionally with one or more buttons on a keypad in communication, e.g., electrical communication, with the electronic controller.

The following description of the operation of an exemplary embodiment of the vehicle leveling systems disclosed here should not be construed to be the only possible operation or implementation of the inventive principles. Rather, numerous additional and alternative operation modes will be apparent to those skilled in the art given the benefit of this disclosure and will be determined in large measure by the requirements and operating environment of each particular embodiment. The subject exemplary leveling system has multiple modes or phases, e.g., three or more, of operation: Engage, Level, and Retract, along with low voltage protection. The leveling system comprises an electronic controller having electronic memory configured to store the last operation performed. When the leveling system is energized, it shows the current status of the system. In this example, in order to activate the system's leveling jacks, the operator should:

a. Have the vehicle ignition on;
b. Place the vehicle's transmission into Park or Neutral;
c. Engage the vehicle's parking brake; and
d. Have voltage of at least 13 volts at start of operation.

The electronic controller is substantially as shown in FIG. 1, and the three vehicle status lights will be on. The operator must push the power switch each time to start a leveling operation. The controller will shut off (indicated by the On/Off light going out), five (5) minutes from last activation to prevent false or unintended activation of the jacks. The operator pushes the power switch and its indicator light illuminates. The four jack status indicator lights illuminate, indicating their current status.

A. Engage:
1. The operator depresses the extend-enable switch and the all-activate switch simultaneously.
2. The indicators for the extend-enable and all-activate buttons will be lit. The front and rear jacks will extend simultaneously (optionally with a delay, e.g., a 250 millisecond delay, between the front jacks and the rear jacks, as needed, to reduce power surge effects). Such status is indicated by the configuration of the indicator lights.
3. Once the jacks start moving, the operator can depress any switch to "panic stop" the jacks. The system stays on, but a successful "all retract" should be performed to continue.
4. As each jack touches the ground, the control module receives a signal indicating the corresponding jack has engaged the ground and shuts off power to that jack. The indicator light for that jack indicates its de-powered status.

B. Level:
1. The operator next actuates the group-activate switches (coordinating actuation of each with the extend-enable or retract-enable switch) in any sequence or pattern, to "chase" a bubble in a leveling target, i.e., to position the bubble at a location corresponding to the vehicle being level. The group-activate switches are presented on a touch pad of the mounting plate of the electronic controller. Depending on which part of the touch pad is touched by the operator, two adjacent jacks, i.e., the two jacks of the pair corresponding to the part of the touch pad touched by the operator, (front pair, rear pair, driver side pair or passenger side pair) simultaneously retract or extend. The indicator light configuration indicates the two jacks activated at any point in time.
2. As long as the switch on the touch pad is pushed, corresponding jacks will operate.
3. If either jack of an activated pair is fully extended, the indicator light configuration so indicates and further operation of that pair of jacks in the extend direction ceases. If the switch is held on, the other jack in that pair continues to operate along with the jack sharing a plane with the operating jack (e.g., if the front two jacks are extending and the left front jack becomes fully extended, the right front jack will continue to operate and the right rear jack will start to extend.)
4. If the operator overshoots and needs to retract the jacks, the operator presses the retract-enable button and operates the desired group-activate switch to simultaneously operate the jacks in pairs.
5. To level the vehicle by retracting the jacks, the operator pushes the retract-enable switch. The Extend light goes out and the Retract light is illuminated. Operation continues as before, except the jacks selected retract instead of extend.

C. Retract:
1. When the operator wishes to retract all four levelers simultaneously, the operator presses the retract-enable switch and the all-activate switch simultaneously.
2. All four jacks will retract simultaneously (optionally with a delay, e.g., a 250 millisecond delay, between the front jacks and the rear jacks, as needed, to reduce the effect of power surges). As each jack starts to move, the indicator light configuration will so indicate. The central touch pad is inhibited during All Extend/Retract except for "panic stop."
3. When current draw in the retract direction meets a defined current pattern, e.g., a rapid or sharp change in an electronic value such as current, voltage, etc., for a motor clutching for a given jack (indicating full retraction), the jack will stop and the light configuration will indicate this. Operator is also requested to do a visual inspection to insure all jacks are fully retracted before engaging transmission into drive.
4. Prior to all the jacks being fully retracted, if the operator depresses the vehicle brake and takes the vehicle out of neutral or park, the warning horn will sound and the four jack lights will blink Red. The jacks will start to automatically retract.

D. Low Voltage Protection:
1. The control module will also monitor battery buss voltage.
2. If during operation, the buss voltage falls below 10.5V DC for a predetermined, selected or defined time, e.g., greater than 25 seconds, jack operation will cease and the low voltage LED will flash.
3. Controls will be inoperable until battery voltage climbs above a predetermined, selected or defined value, e.g., 13VDC, at which time leveling functions will resume.

While the invention has been described with respect to specific examples, including presently preferred modes of carrying out the invention, those skilled in the art will appreciate that there are numerous variations and permutations of the above described systems and techniques that fall within the spirit and scope of the invention as set forth in the following claims.

What is claimed is:

1. A vehicle having a vehicle leveling system operable to level the vehicle when the vehicle is stationary, the vehicle leveling system comprising:

multiple leveling jacks mounted to the vehicle at spaced locations, each of the leveling jacks being controllably extendable and retractable to level the vehicle cooperatively with the other leveling jacks; and an electronic controller comprising:
  an extend-enable switch;
  a retract-enable switch;
  an all-activate switch; and
  at least a first group-activate switch, the electronic controller being configured:
    to generate, upon coordinated actuation of the extend-enable switch and the all-activate switch, an all-extend electronic signal operative to activate simultaneous extension of all of the leveling jacks simultaneously;
    to generate, upon coordinated actuation of the retract-enable switch and the all-activate switch, an all-retract electronic signal operative to activate simultaneous retraction of all of the leveling jacks simultaneously;
    to generate, upon coordinated actuation of the extend-enable switch and the first group-activate switch, a first group-extend electronic signal operative to activate simultaneous extension of a first sub-set of the leveling jacks; and
    to generate, upon coordinated actuation of the retract-enable switch and the first group-activate switch, a first group-retract electronic signal operative to activate simultaneous retraction of the first sub-set of the leveling jacks.

2. The vehicle of claim 1 wherein activating all of the leveling jacks of the vehicle leveling system simultaneously comprises delaying activation of at least one of the leveling jacks until after activation of at least one other of the leveling jacks.

3. The vehicle of claim 1 wherein the electronic controller further comprises a plurality of status indicators operative to indicate the status of a switch or operating mode of the electronic controlled.

4. The vehicle of claim 3 wherein at least one of the status indicators is a visual indicator.

5. The vehicle of claim 4 wherein the visual indicator comprises an incandescent bulb, an LED, a multi-color LED or a liquid crystal display.

6. The vehicle of claim 3 wherein at least one of the status indicators is an audible indicator.

7. The vehicle of claim 1 wherein the electronic controller further comprises a power switch for controlling power to the electronic controller.

8. The vehicle of claim 1 wherein the electronic controller further comprises a processor for controlling the operation of the leveling system at least partially in response to manual actuation of the switches of the electronic controller.

9. The vehicle of claim 8 wherein the electronic controller further comprises electronic memory configured for signal communication with the processor and operative to store information about the status or operating history of the vehicle leveling system.

10. The vehicle of claim 1 wherein the electronic controller is in operative communication with a sensor or link operative to detect whether the transmission of the vehicle is in park or neutral.

11. The vehicle of claim 10 wherein the electronic controller is further configured to prevent extension of the leveling jacks if the transmission of the vehicle is not in park or neutral.

12. The vehicle of claim 10 wherein the electronic controller is further configured to automatically retract at least certain of the leveling jacks if the vehicle brake is engaged and the transmission of the vehicle is moved out of park or neutral.

13. The vehicle of claim 1 wherein the electronic controller is in operative communication with a sensor or link operative to detect whether a parking brake of the vehicle is engaged.

14. The vehicle of claim 13 wherein the electronic controller is further configured to prevent extension of the leveling jacks if the parking brake of the vehicle is not engaged.

15. The vehicle of claim 13 wherein the electronic controller is further configured to automatically retract at least certain of the leveling jacks if the parking brake of the vehicle is dis-engaged.

16. The vehicle of claim 1 wherein at least a plurality of the leveling jacks are electromechanical leveling jacks.

17. The vehicle of claim 16 wherein the electronic controller is in operative communication with a sensor operative to detect voltage of power supplied to the electromechanical jacks.

18. The vehicle of claim 17 wherein the electronic controller is further configured to prevent extension of the leveling jacks if the voltage is less than a pre-determined value.

19. The vehicle of claim 18 wherein the electronic controller is in operative communication with a sensor operative to monitor an electronic value supplied to the electromechanical jacks.

20. The vehicle of claim 19 wherein the electronic controller is further configured to control extension of individual leveling jacks at least partly in response to the electronic value drawn by that leveling jack.

21. The vehicle of claim 18 or claim 19 wherein the electronic value is current or voltage.

22. The vehicle of claim 1 wherein at least the extend-enable switch, the retract-enable switch and the all-activate switch are push button switches.

23. The vehicle of claim 1 wherein at least the extend-enable switch, the retract-enable switch and the all-activate switch are touch panel switches.

24. The vehicle of claim 1 wherein the electronic controller further comprises a level indicator.

25. The vehicle of claim 24 wherein the level indicator is a bubble indicator.

* * * * *